(12) United States Patent
Kao et al.

(10) Patent No.: US 8,395,617 B2
(45) Date of Patent: Mar. 12, 2013

(54) METHOD AND RELATED SYSTEM FOR DISPLAYING 2D AND 3D IMAGES SIMULTANEOUSLY

(75) Inventors: Meng-Chao Kao, Taipei (TW); Tzu-Chiang Shen, Taoyuan County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 498 days.

(21) Appl. No.: 12/757,027

(22) Filed: Apr. 8, 2010

(65) Prior Publication Data

US 2011/0169831 A1 Jul. 14, 2011

(30) Foreign Application Priority Data

Jan. 8, 2010 (TW) .............................. 99100371 A

(51) Int. Cl.
*G06T 15/00* (2006.01)
*G06T 15/10* (2006.01)
*G06T 15/20* (2006.01)
(52) U.S. Cl. ........................................ 345/419; 345/427
(58) Field of Classification Search ........................ None
See application file for complete search history.

(56) References Cited

U.S. PATENT DOCUMENTS

| 5,367,801 A | 11/1994 | Ahn |
| 6,157,424 A | 12/2000 | Eichenlaub |
| 6,906,762 B1 | 6/2005 | Witehira |
| 2006/0221443 A1 | 10/2006 | Cha |
| 2007/0008240 A1* | 1/2007 | Kurahashi et al. ................. 345/6 |
| 2008/0252639 A1* | 10/2008 | Ijzerman et al. ............... 345/419 |
| 2009/0135090 A1* | 5/2009 | Kim ................................... 345/6 |
| 2010/0098326 A1* | 4/2010 | Abeloe ......................... 382/154 |

OTHER PUBLICATIONS

Fehn, C.; Pastoor, R.S.; , "Interactive 3-DTV-Concepts and Key Technologies," Proceedings of the IEEE , vol. 94, No. 3, pp. 524-538, Mar. 2006.*

* cited by examiner

*Primary Examiner* — Daniel Hajnik
(74) *Attorney, Agent, or Firm* — Winston Hsu; Scott Margo

(57) ABSTRACT

An image display method receives a two-dimensional image data and a depth data both corresponding to a two-dimensional image and a three-dimensional image. The two-dimensional image data and the depth data is encoded so that the sub-pixels of the two-dimensional image data and the depth data related to the three-dimensional image have gray values whose least significant bits vary in a predetermined manner. After receiving the encoded two-dimensional image data and the encoded depth data at a receiving side, a two-dimensional display region and a two-dimensional display region are detected according to the variations in the gray values of the sub-pixels. The method can thus display the three-dimensional image in the three-dimensional display region of the frame and display the two-dimensional image in the two-dimensional display region of the frame.

10 Claims, 9 Drawing Sheets

METHOD AND RELATED SYSTEM FOR DISPLAYING 2D AND 3D IMAGES SIMULTANEOUSLY

BACKGROUND OF THE INVENTION

1. Field of the Invention

The present invention is related to a display method and a related system, and more particularly, to a display method and a related system capable of simultaneously displaying a two-dimensional image and a three-dimensional image.

2. Description of the Prior Art

Three-dimensional (3D) display technology provides viewers with more vivid visual experiences than traditional two-dimensional (2D) display technology. Many efforts have been made in order to achieve 3D images based on existing 2D environment. Currently, mainstream 3D technologies include parallax barrier technology and depth fused technology which utilizes multiple panels.

Traditionally, many cameras are used for capturing three-dimensional visual signals or images which required large storage capacity. Data transmission or preservation may thus be difficult with limited bandwidth. Therefore, ATTEST (Advanced Three-Dimensional Television System Technologies) proposed a visual system utilizing multi-panel depth fused technology which can largely improve data transmission rate by capturing a two-dimensional image data and a depth data, both corresponding to a specific three-dimensional image, using a single camera and reconstructing the original three-dimensional image at a receiving side using depth-image-based rendering (DIBR) algorithm.

FIG. 1 is a functional diagram of a prior art display system 100 based on depth fused technology. FIG. 2 is a diagram illustrating the operation of the prior art display system 100. The display system 100 includes a front panel 10F, a back panel 10B, a data-converting circuit 20, and a data-decoding circuit 30. After receiving a two-dimensional image data 2D and its related depth data Z both corresponding to a specific three-dimensional image, the data-converting circuit 20 of the display system 100 converts the two-dimensional image data 2D into a format compatible to the current digital video broadcast (DVB) standard (such as MPEG-2) and compresses the depth data Z 2D into a specific format (such as MPEG-4 or AVC) for accelerating data transmission. After transmitting the compressed two-dimensional image data 2D and the depth data Z to the receiving side, the data-decoding circuit 30 of the display system 100 obtains a corresponding front-panel image $DATA_F$ and a corresponding back-panel image $DATA_B$ based on DIBR algorithm. The front-panel image $DATA_F$ and the back-panel image $DATA_B$ are then outputted to the front panel 10F and the back panel 10B respectively, thereby providing 2D/3D compatibility. While both associated with the two-dimensional image data 2D, the luminescences the front-panel image $DATA_F$ and the back-panel image $DATA_B$ vary according to the depth data Z.

As depicted in FIG. 2, the front panel 10F and the back panel 10B are substantially parallel to each other. From the perspective of a viewer 16, the front panel 10F is closer than the back panel 10B. The front panel 10F is configured to display the front-panel image $DATA_F$, while the back panel 10B is configured to display the back-panel image $DATA_B$. For spherical patterns A-C in a certain three-dimensional image, the front-panel image $DATA_F$ includes corresponding circular patterns A'-C', while the back-panel image $DATA_B$ includes corresponding circular patterns A"-C". When the circular patterns A'-C' and A"-C" having different luminescences are overlapped, the viewer 16 can observe the stereopsis of the spherical patterns A-C. In FIG. 2, the circular patterns A' in the front-panel image $DATA_F$ is darker than the circular patterns A" in the back-panel image $DATA_B$, and the viewer 16 perceives the spherical pattern A at a location closer to the back panel 10B along A-A' direction; the circular patterns B' in the front-panel image $DATA_F$ and the circular patterns B" in the back-panel image $DATA_B$ have the same luminescence, and the viewer 16 perceives the spherical pattern B at a midway location between the front panel 10F and the back panel 10B along A-A' direction; the circular patterns C' in the front-panel image $DATA_F$ is brighter than the circular patterns C" in the back-panel image $DATA_B$, and the viewer 16 perceives the spherical pattern C at a location closer to the front panel 10F along C-C' direction.

The prior art display system 100 can switch between 2D and 3D modes. In 3D mode, the display system 100 shows the same image on the front panel 10F and the back panel 10B according to the two-dimensional image data 2D and adjusts the luminescences of the front-panel image and the back-panel images according to the depth data Z so as to provide the viewer 16 with three-dimensional visual perception. In 2D mode, the display system 100 turns off the back panel 10B and only shows planar images on the front panel 10F. Although the prior art display system 100 provides 2D/3D compatibility, only one of the 2D/3D modes can be activated at the same time, therefore unable to display three-dimensional images and two-dimensional images simultaneously in the same frame.

SUMMARY OF THE INVENTION

The present invention provides a method for simultaneously displaying a two-dimensional image and a three-dimensional image in a frame. The method includes receiving a two-dimensional image data and a depth data both corresponding to the two-dimensional image and the three-dimensional image; encoding the two-dimensional image data and the depth data so that sub-pixels of the two-dimensional image data and the depth data which are related to the three-dimensional image have grayscale values whose least significant bits vary in a predetermined manner; receiving the encoded two-dimensional image data and the encoded depth data at a receiving side and detecting a three-dimensional display region according to variations in the gray values of the sub-pixels; and displaying the three-dimensional image in the three-dimensional display region of the frame and displaying the two-dimensional image in a two-dimensional display region of the frame.

The present invention also provides display system capable of simultaneously displaying a two-dimensional image and a three-dimensional image in a frame. The display system includes a data-encoding circuit, a data-processing circuit, a front panel and a back panel. The data-encoding circuit is configured to receive a two-dimensional image data and a depth data both corresponding to the two-dimensional image and the three-dimensional image and encode the two-dimensional image data and the depth data so that sub-pixels of the two-dimensional image data and the depth data which are related to the three-dimensional image have grayscale values whose least significant bits vary in a predetermined manner. The data-processing circuit includes a range-detecting circuit configured to receive the encoded two-dimensional image data and the encoded depth data and detect a three-dimensional display region according to variations in sub-pixel gray values of the encoded two-dimensional image data and the encoded depth data; an image-accessing control circuit configured to generate a corresponding front panel two-dimensional image according to a two-dimensional display region in the frame and the encoded two-dimensional image data; a calculation unit configured to generate a front panel three-dimensional image and a back panel three-dimensional image by processing data in the three-dimensional display region; a range-adjusting circuit configured to adjust resolutions of the front panel three-dimensional image and the back panel three-dimensional image for matching the three-dimensional display region; a luminescence-adjusting circuit configured to adjust luminances of the front panel three-dimensional image and the back panel three-dimensional image data according to the depth data; a front panel image overlapping circuit configured to generate a front panel image by overlapping the front panel three-dimensional image and the front panel two-dimensional image; and a back panel image overlapping circuit configured to generate a back panel image by overlapping the back panel three-dimensional image and a black image. The front panel is configured to display the front panel image. The back panel configured to display the back panel image.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 4 and 5a-5f are diagrams illustrating the operation of the display system according to the present invention.

DETAILED DESCRIPTION

Figure 1:
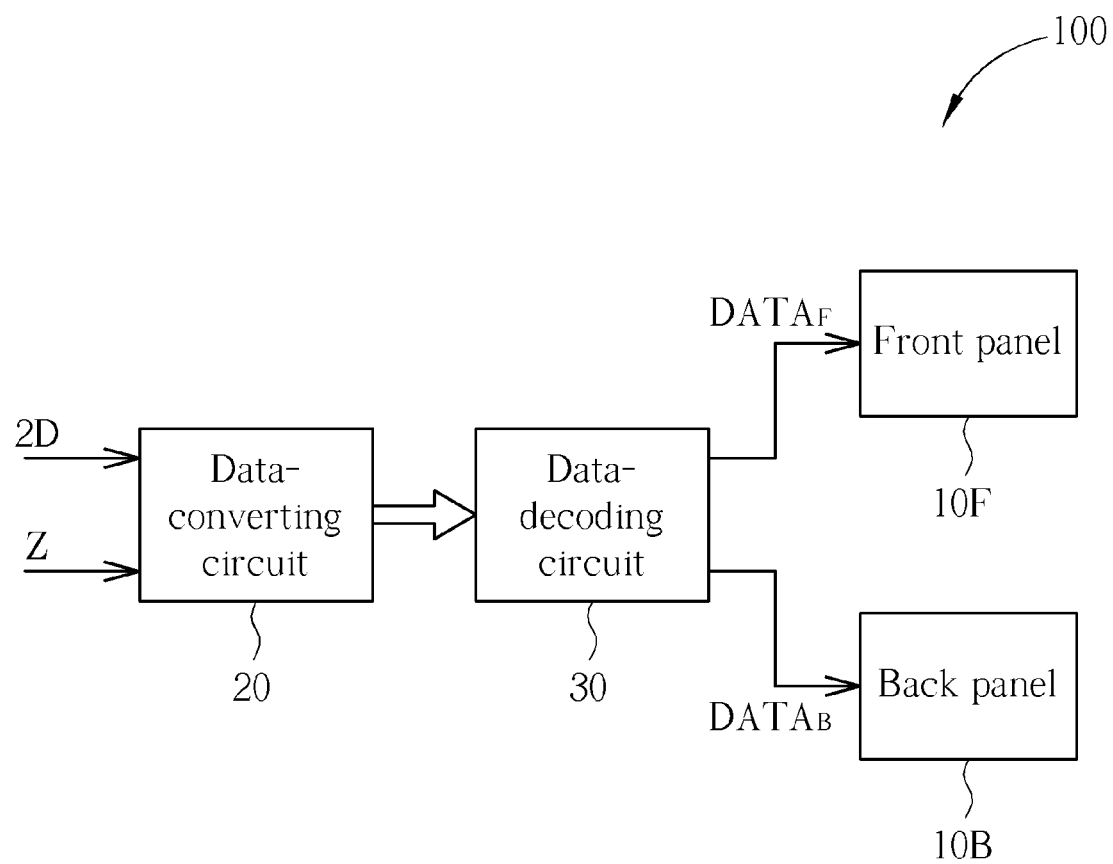
FIG. 1 is a functional diagram of a prior art display system.
Figure 2:
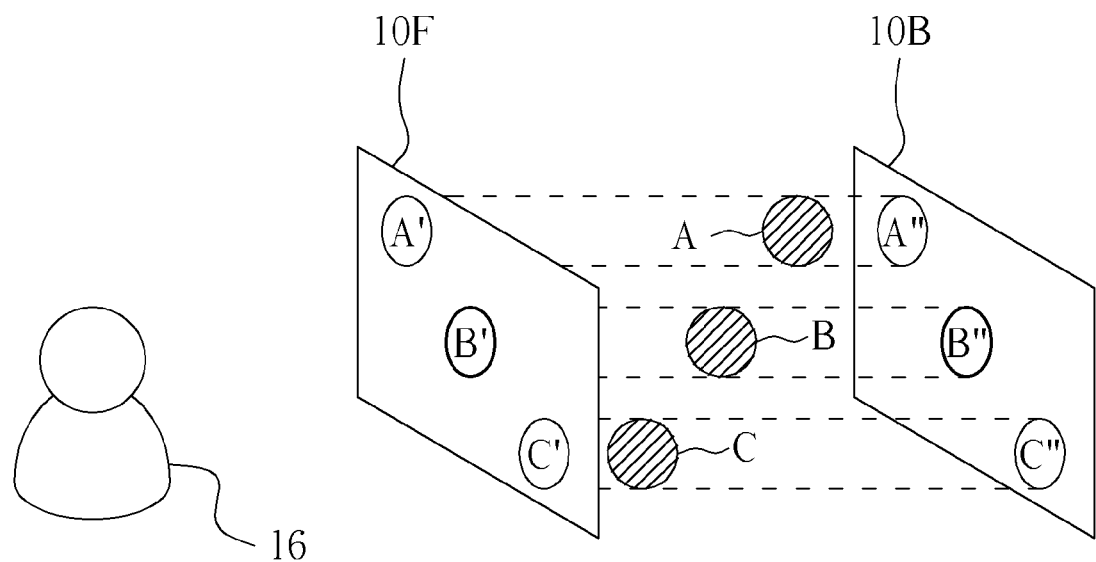
FIG. 2 is a diagram illustrating the operation of the prior art display system in FIG. 1.
Figure 3:
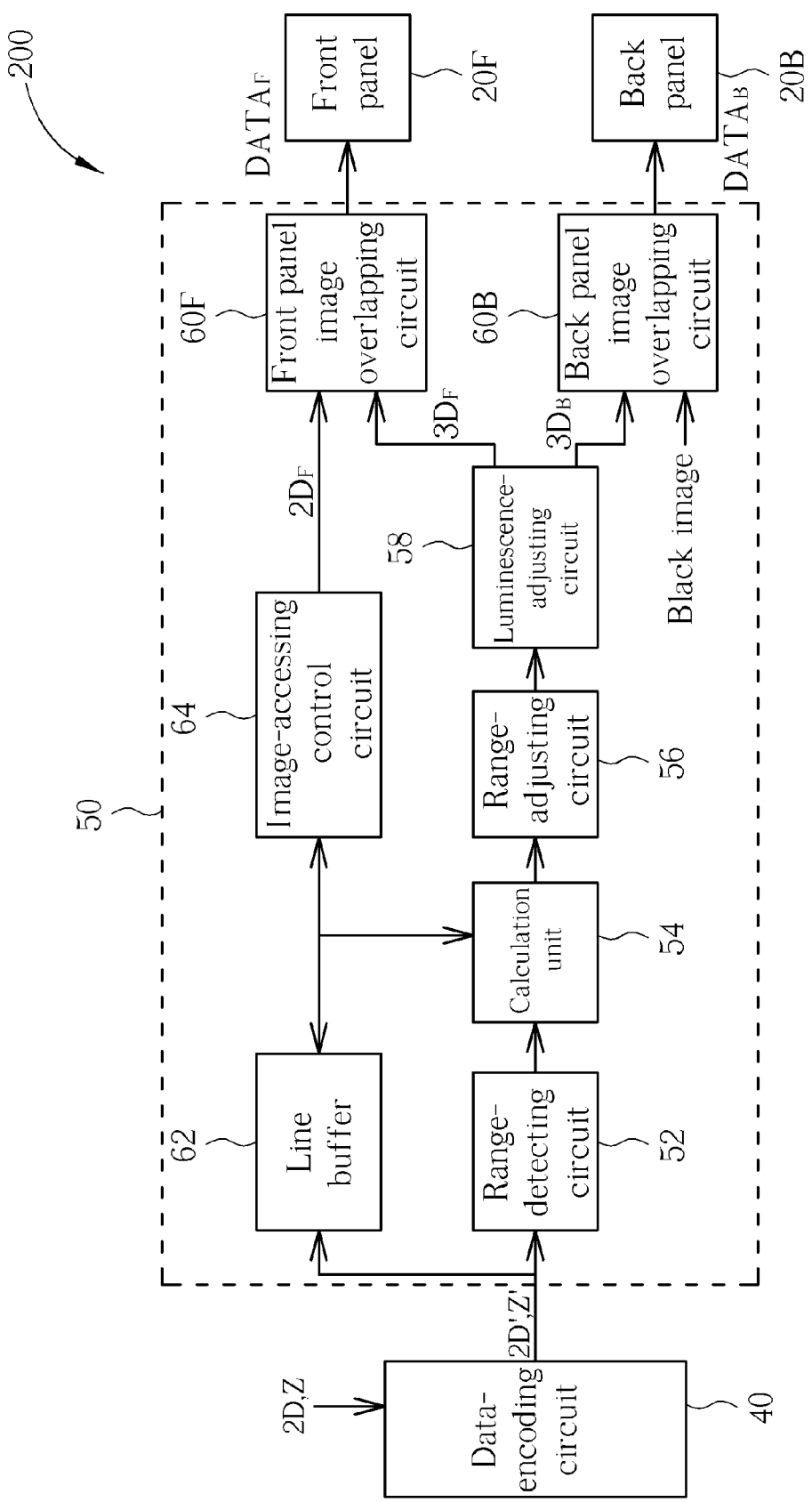
FIG. 3 is a functional diagram of a display system capable of simultaneously displaying three-dimensional and two-dimensional images according to the present invention.

FIG. 3 is a functional diagram of a display system 200 capable of simultaneously displaying three-dimensional and two-dimensional images according to the present invention. The display system 200 includes a front panel 20F, a back panel 20B, a data-encoding circuit 40, and a data-processing circuit 50. After receiving a two-dimensional image data 2D and its related depth data Z both corresponding to a specific three-dimensional image, the data-encoding circuit 40 of the display system 200 performs format conversion and data compression, as well as encodes the two-dimensional image data 2D and the depth data Z. The encoded two-dimensional image data 2D' and the encoded depth data Z' include information regarding the three-dimensional display region of a display frame (which will be illustrated in detail). After transmitting the encoded two-dimensional image data 2D' and the encoded depth data Z' to the receiving side, the data-processing circuit 50 of the display system 200 obtains a corresponding front-panel image $DATA_F$ and a corresponding back-panel image $DATA_B$ by performing three-dimensional display region detection, three-dimensional image adjustment, image overlapping and luminescence adjustment (which will be illustrated in detail). The front-panel image $DATA_F$ and the back-panel image $DATA_B$ are then outputted to the front panel 10F and the back panel 10B, respectively.

Figure 4:
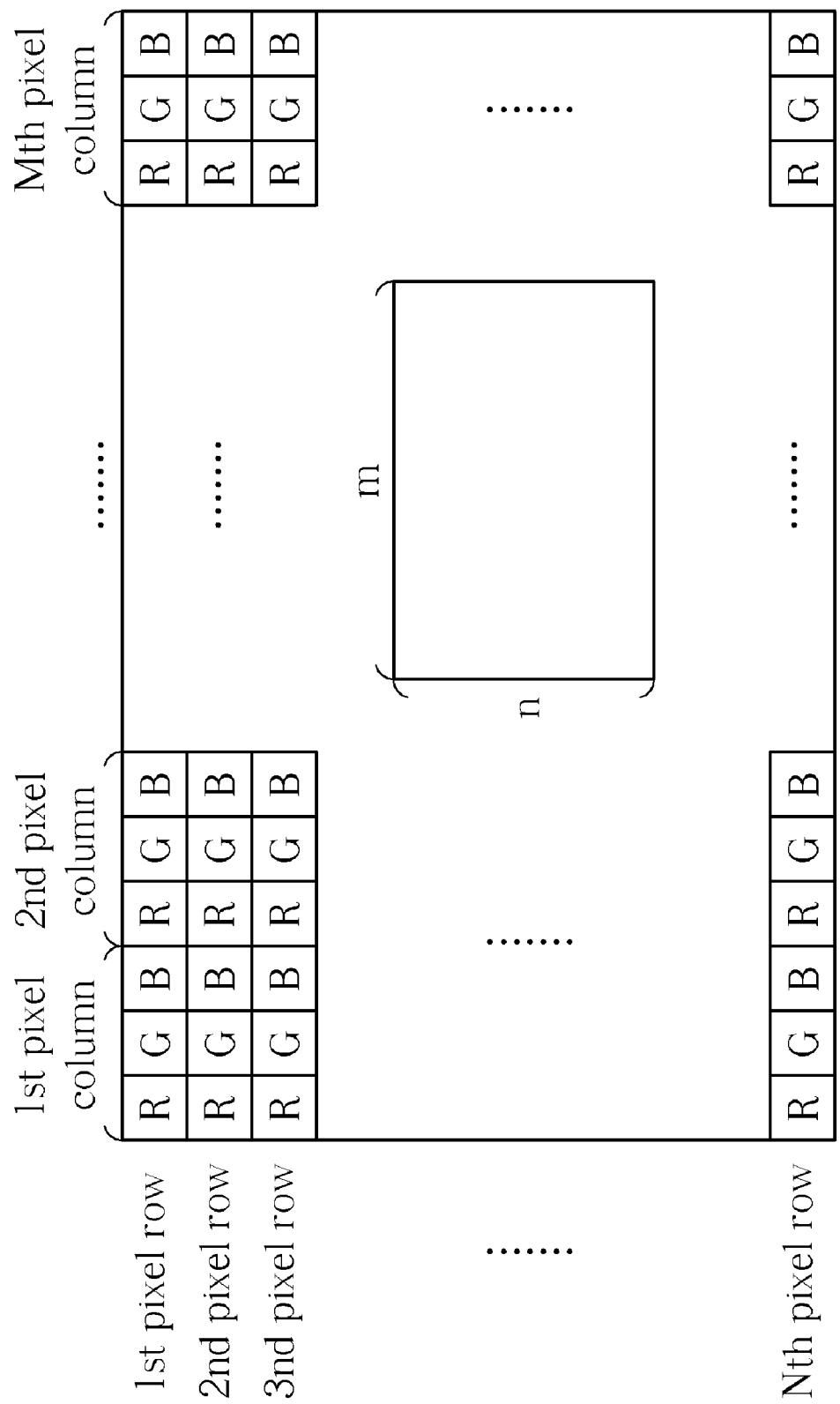
Figures 5A, 5B, 5C:
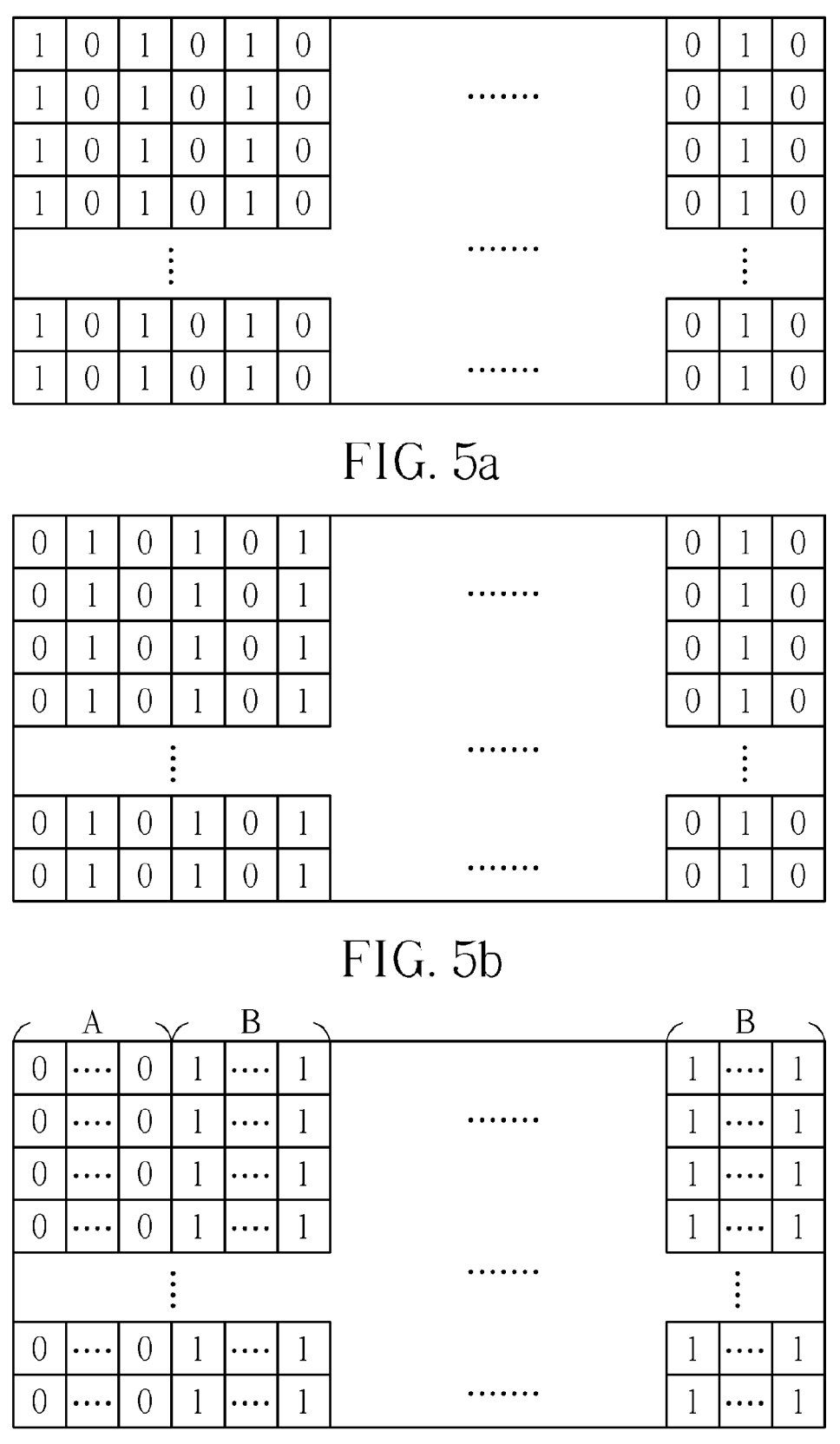
Figures 5D, 5E, 5F:
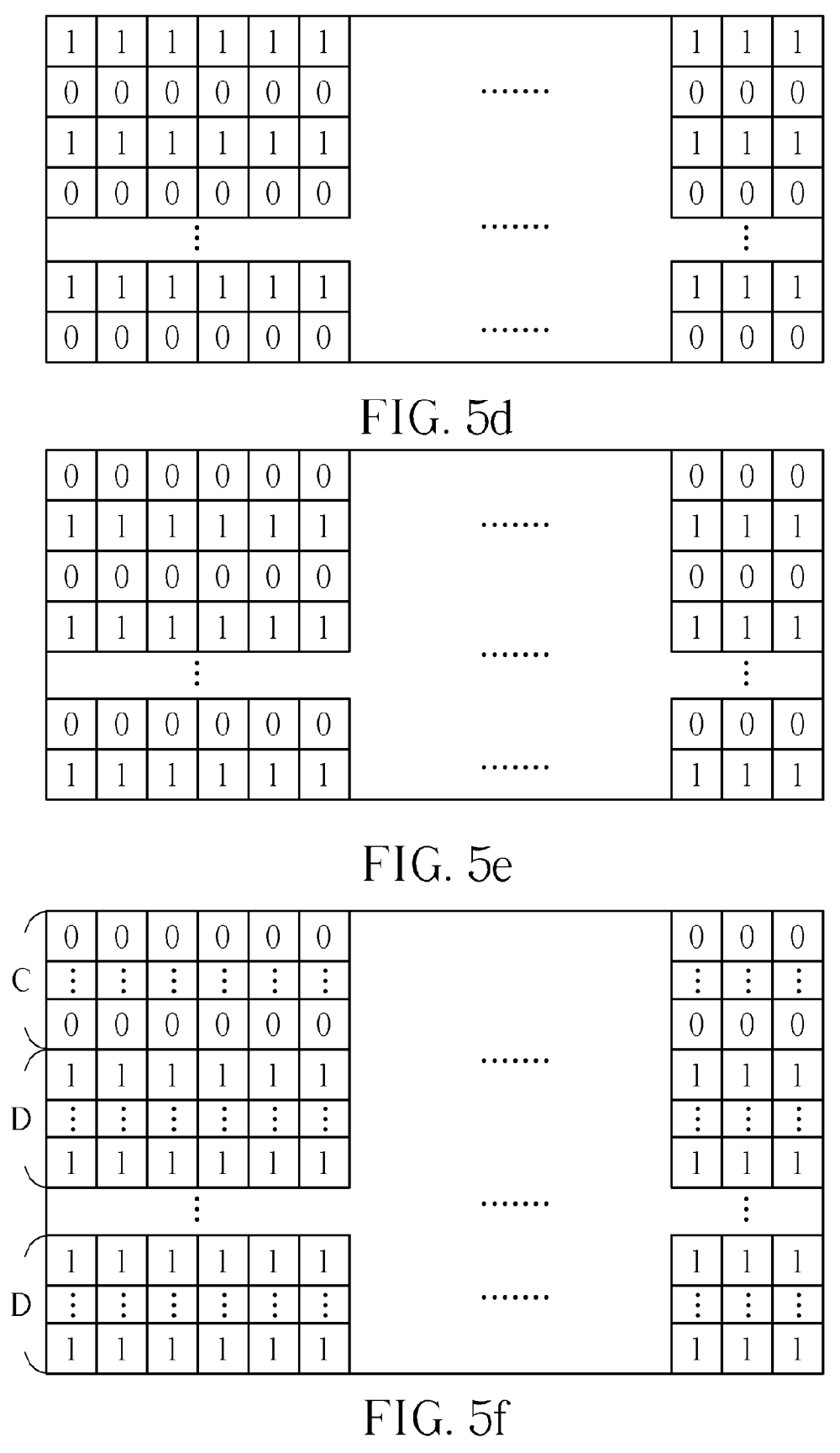

FIGS. 4 and 5a-5d are diagrams illustrating the operation of the display system 200 according to the present invention. As depicted in FIG. 4, assume that the display system 200 provides M*N resolution, in which M columns and N rows are used for representing an entire frame. The pixel array includes M*N pixels, each of which includes a red sub-pixel R, a green sub-pixel G and a blue sub-pixel B. Two-dimensional planar images can thus be displayed by adjusting the grayscale values of the sub-pixels. The display system 200 of the present invention can simultaneously display three-dimensional and two-dimensional images, such as simultaneously displaying an m*n three-dimensional window within an M*N two-dimensional window. The present invention operates according to sub-pixel-based data encoding of three-dimensional image data, in which the data-encoding circuit 40 divides the grayscale value of each sub-pixel in the two-dimensional image data 2D and the depth data Z by 2, removes the remainder and then multiples each grayscale value by 2. In other words, the grayscale value of each sub-pixel in the two-dimensional image data 2D and the depth data Z includes a least significant bit (LSB) which is set to zero. Next, the data-encoding circuit 40 increases the grayscale values of certain sub-pixels by 1 so that a specific LSB arrangement can be observed in the sub-pixel grayscale values. In the embodiment illustrated in FIG. 5a, the grayscale values of the sub-pixels in the odd-numbered columns are increased by 1; in the embodiment illustrated in FIG. 5b, the grayscale values of the sub-pixels in the even-numbered columns are increased by 1; in the embodiment illustrated in FIG. 5c, the grayscale values of the sub-pixels in B adjacent columns are increased by 1 every other A adjacent columns; in the embodiment illustrated in FIG. 5d, the grayscale values of the sub-pixels in the odd-numbered rows are increased by 1; in the embodiment illustrated in FIG. 5e, the grayscale values of the sub-pixels in the even-numbered rows are increased by 1; in the embodiment illustrated in FIG. 5f, the grayscale values of the sub-pixels in D adjacent rows are increased by 1 every other C adjacent rows. In the original two-dimensional image data 2D and the depth data Z, the sub-pixel grayscale values normally feature a random distribution. In the encoded two-dimensional image data 2D' and the depth data Z' of the present invention, the sub-pixel grayscale values present a specific LSB arrangement, which in turns marks the three-dimensional display region. The possible grayscale discrepancy after data encoding is negligible to human visual perception.

Referring to FIG. 3 again, the data-processing circuit 50 includes a range-detecting circuit 52, a calculation unit 54, a range-adjusting circuit 56, a luminescence-adjusting circuit 58, a front panel image overlapping circuit 60F, a back panel image overlapping circuit 60B, a line buffer 62, and an image-accessing control circuit 64. The encoded two-dimensional image data 2D' and the encoded depth data Z' received from the data-encoding circuit 40 are stored in the line buffer 62 of the data-processing circuit 50, while the three-dimensional display region is detected using the range-detecting circuit 52. In the embodiment illustrated in FIG. 5a or 5b, the range-detecting circuit 52 monitors the LSB variations in the grayscale values of each sub-pixel columns. If the LSB pattern of "1010 . . . 10" is present in at least P adjacent columns of sub-pixels, the three-dimensional display region is determined to include the region featuring the LSB pattern of "1010 . . . 10". Meanwhile, the start point of the three-dimensional display region is transmitted to the calculation unit 54.

Figure 6A:
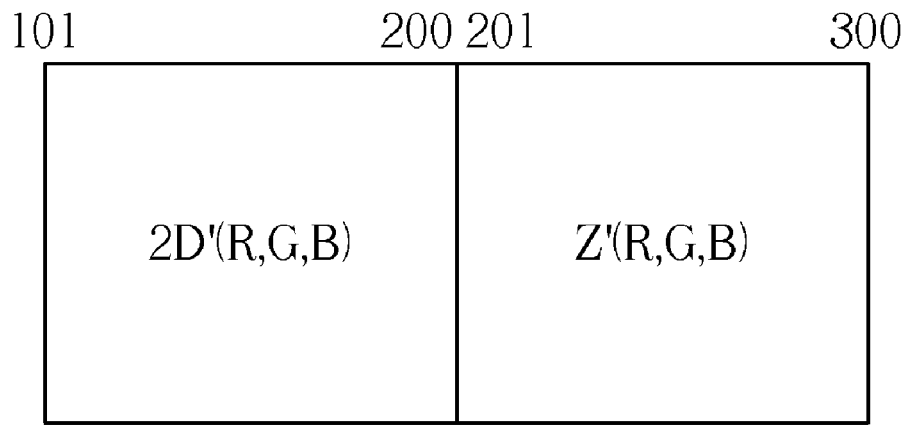
FIGS. 6a and 6b are diagrams illustrating the operations of the calculation unit according to the present invention.
Figure 6B:
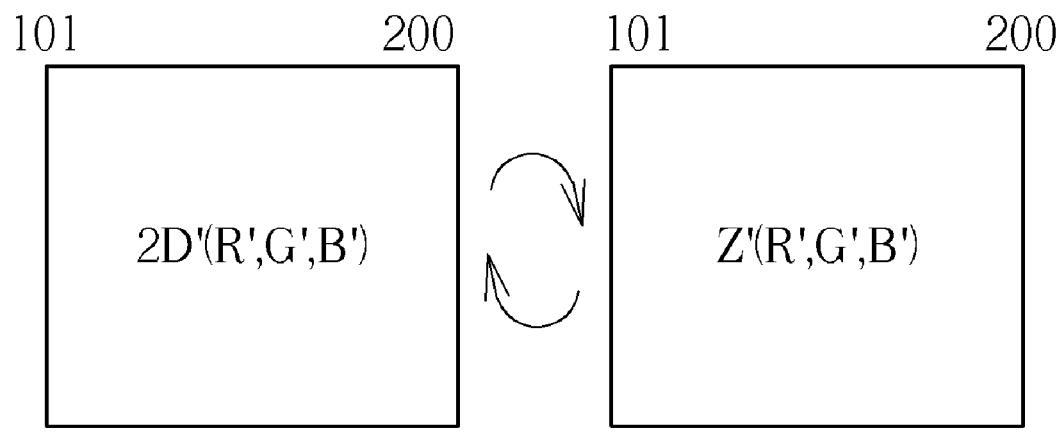

FIGS. 6a and 6b are diagrams illustrating the operations of the calculation unit 54 according to the present invention. Assuming the display system 200 provides 1366*768 resolution and the three-dimensional display region includes the $101_{st}$-$103_{rd}$ columns of sub-pixels in the horizontal direction, the calculation unit 54 performs operations on the grayscale value of each sub-pixel in the three-dimensional display region, which is associated with the two-dimensional image data 2D' and the depth data Z'. Assuming, for ease of explanation, that the two-dimensional image data 2D' and the depth data Z' are equal in width along the vertical direction, the two-dimensional image data 2D' can be represented by the $101_{st}$-$200_{th}$ columns of pixels, while the depth data Z' can be represented by the $201_{st}$-$300_{th}$ columns of pixels. The data of each pixel in the three-dimensional display region can be represented by 2D' (R, G, B) and Z'(R, G, B). As depicted in FIG. 6a, the $101_{st}$-$200_{th}$ columns of pixels correspond to the $201_{st}$-$300_{th}$ columns of pixels, respectively.

First, the calculation unit 54 obtains the relationship between corresponding pixels in the two-dimensional image data 2D' and the depth data Z'. Therefore, the two-dimensional image data 2D'(R', G', B') and the depth data Z'(R', G', B') can be represented by the same pixels after pixel-mapping, such as by the $101_{st}$-$200_{th}$ columns of pixels. Since pixel-mapping can be performed differently in other applications, FIG. 6b is merely for illustrative purpose and does not limit the scope of the present invention.

Next, the calculation unit 54 performs operations on the grayscale value of each sub-pixel in three-dimensional display region in order to obtain a front panel three-dimensional image data $3D_F'$ and a back panel three-dimensional image data $3D_B'$, represented as follows:

$$3D_F'=2D'(R',G',B')*Z'(R',G',B')$$

$$3D_B'=2D'(R',G',B')*[1-Z'(R',G',B')]$$

Figure 7:
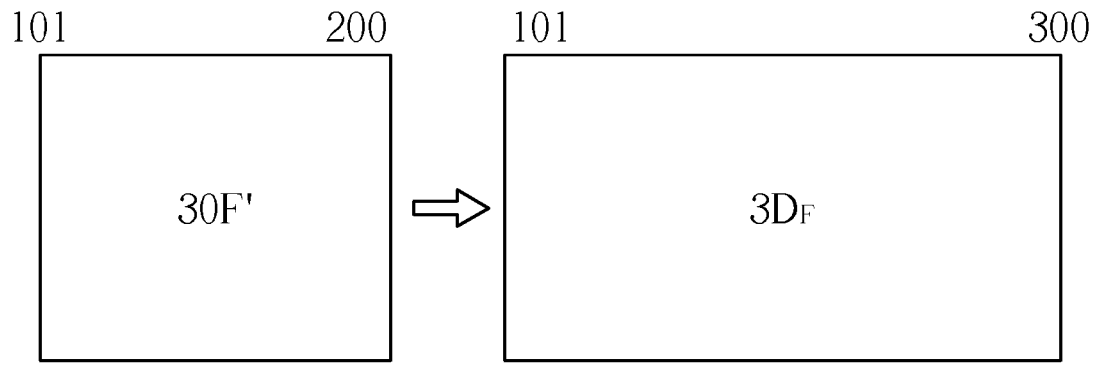
FIG. 7 is a diagram illustrating the operation of the range-adjusting circuit according to the present invention.
Figure 7:
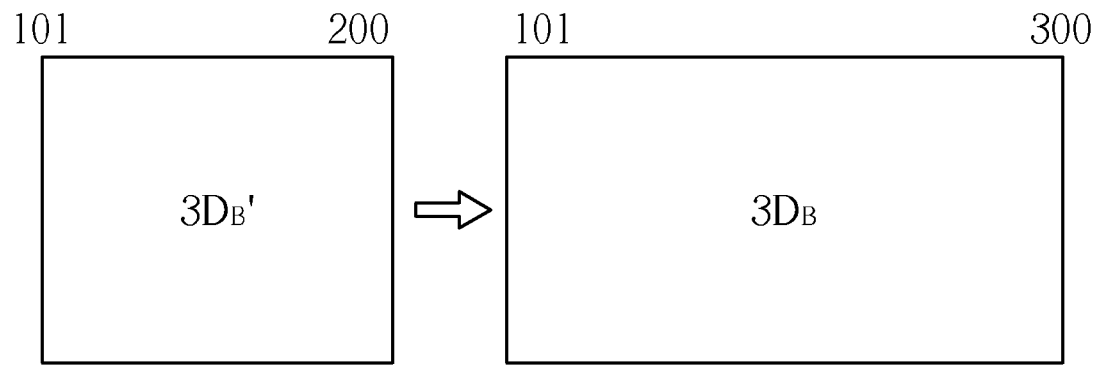

FIG. 7 is a diagram illustrating the operation of the range-adjusting circuit 56 according to the present invention. Compared to the entire three-dimensional display region, the front panel three-dimensional image data $3D_F'$ and the back panel three-dimensional image data $3D_B'$ only have half the resolution. Therefore, the range-adjusting circuit 56 performs horizontal expansion on the front panel three-dimensional image data $3D_F'$ and the back panel three-dimensional image data $3D_B'$ in order to obtain a corresponding front panel three-dimensional image data $3D_F$ and a corresponding back panel three-dimensional image data $3D_B$ having full resolution, as depicted in FIG. 7. Next, the luminescence-adjusting circuit 58 adjusts the luminescence of the front panel three-dimensional image data $3D_F$ and the back panel three-dimensional image data $3D_B$, transmits the front panel three-dimensional image data $3D_F$ to the front panel image overlapping circuit 60F and transmits the back panel three-dimensional image data $3D_B$ to the back panel image overlapping circuit 60B.

Figure 8A:
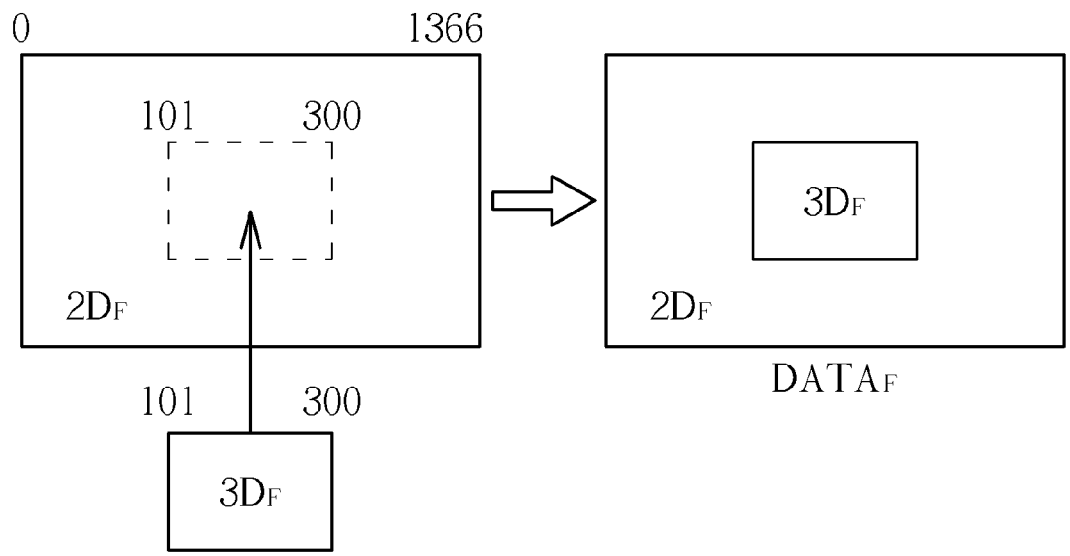
FIG. 8a is a diagram illustrating the operation of the front panel image overlapping circuit according to the present invention.
Figure 8B:
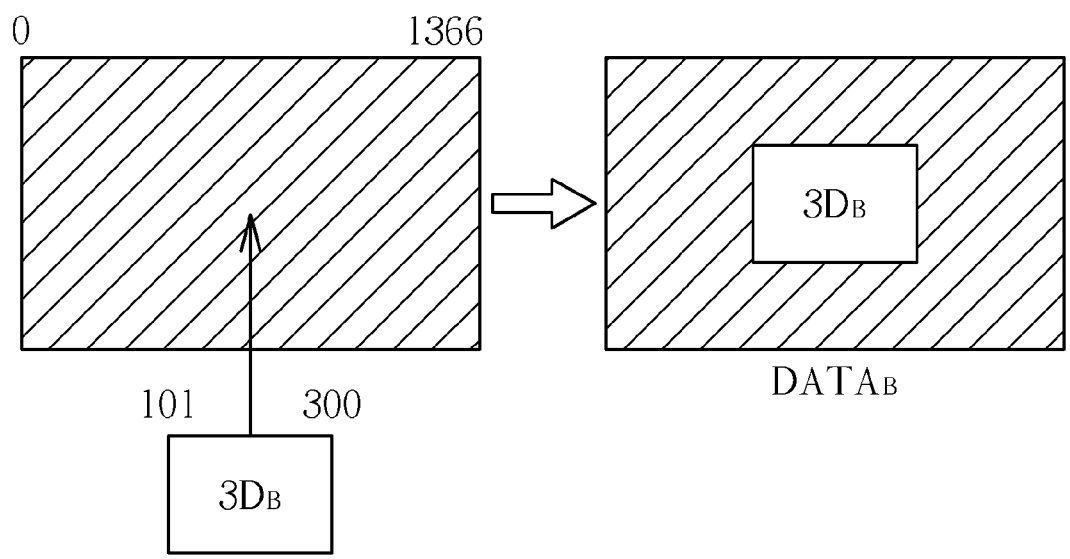
FIG. 8b is a diagram illustrating the operation of the back panel image overlapping circuit according to the present invention.

FIG. 8a is a diagram illustrating the operation of the front panel image overlapping circuit 60F according to the present invention. FIG. 8b is a diagram illustrating the operation of the back panel image overlapping circuit 60B according to the present invention. The front panel image overlapping circuit 60F is configured to output a corresponding front panel image $DATA_F$ to the front panel 20F by overlapping the front panel three-dimensional image data $3D_F$ and the front panel two-dimensional image data $2D_F$ generated by the image-accessing control circuit 64. The back panel image overlapping circuit 60B is configured to output a corresponding back panel image $DATA_B$ to the back panel 20B by overlapping the back panel three-dimensional image data $3D_B$ and a black image.

Therefore, the display system of the present invention can provide 2D/3D compatibility, as well as more display options by displaying three-dimensional images and two-dimensional images simultaneously in the same frame.

Those skilled in the art will readily observe that numerous modifications and alterations of the device and method may be made while retaining the teachings of the invention.

What is claimed is:

1. A method for simultaneously displaying a two-dimensional image and a three-dimensional image in a frame of a display system comprising:
    receiving a two-dimensional image data and a depth data both corresponding to the two-dimensional image and the three-dimensional image;
    encoding the two-dimensional image data and the depth data so that sub-pixels of the two-dimensional image data and the depth data which are related to the three-dimensional image have grayscale values whose least significant bits vary in a predetermined manner;
    receiving the encoded two-dimensional image data and the encoded depth data at a receiving side and detecting a three-dimensional display region of the frame according to variations in the gray values of the sub-pixels;
    obtaining a relationship between sub-pixels of the two-dimensional image data and the depth data in the three-dimensional display region;
    generating a corresponding front panel two-dimensional image according to a two-dimensional display region of the frame and the encoded two-dimensional image data;
    generating a corresponding front panel three-dimensional image and a corresponding back panel three-dimensional image by adjusting sub-pixel grayscale values of the two-dimensional image data according to corresponding sub-pixel grayscale values of the depth;
    generating a front panel image by overlapping the front panel three-dimensional image and the front panel two-dimensional image; and
    displaying the three-dimensional image in the three-dimensional display region of the frame and displaying the two-dimensional image in the two-dimensional display region of the frame.

2. The method of claim 1 further comprising:
    adjusting resolutions of the front panel three-dimensional image and the back panel three-dimensional image for matching the three-dimensional display region.

3. The method of claim 1 further comprising:
    adjusting luminances of the front panel three-dimensional image and the back panel three-dimensional image data according to the depth data.

4. The method of claim 1 further comprising:
    generating a back panel image by overlapping the back panel three-dimensional image and a black image.

5. The method of claim 4 wherein displaying the three-dimensional image in the three-dimensional display region of the frame and displaying the two-dimensional image in the two-dimensional display region of the frame comprises:
    displaying the front panel image on a front panel; and
    displaying the back panel image on a back panel, wherein the front panel and the back panel are substantially parallel to each other.

6. The method of claim 1 wherein encoding the two-dimensional image data and the depth data comprises:

setting least significant bits of all sub-pixel grayscale values in the two-dimensional image data and the depth data which are associated with the three-dimensional display region to zero, and then increasing least significant bits of a predetermined number of sub-pixel grayscale values in the two-dimensional image data and the depth data which are associated with the three-dimensional display region by one.

7. The method of claim 6 wherein the predetermined number of sub-pixels having grayscale values increased by one comprise odd-numbered columns or even-numbered columns of sub-pixels in the two-dimensional image data and the depth data which are associated with the three-dimensional display region.

8. The method of claim 6 wherein the predetermined number of sub-pixels having grayscale values increased by one comprise odd-numbered rows or even-numbered rows of sub-pixels in the two-dimensional image data and the depth data which are associated with the three-dimensional display region.

9. A display system capable of simultaneously displaying a two-dimensional image and a three-dimensional image in a frame comprising:
- a data-encoding circuit configured to receive a two-dimensional image data and a depth data both corresponding to the two-dimensional image and the three-dimensional image and encode the two-dimensional image data and the depth data so that sub-pixels of the two-dimensional image data and the depth data which are related to the three-dimensional image have grayscale values whose least significant bits vary in a predetermined manner;
- a data-processing circuit comprising:
  - a range-detecting circuit configured to receive the encoded two-dimensional image data and the encoded depth data and detect a three-dimensional display region of the frame according to variations in sub-pixel gray values of the encoded two-dimensional image data and the encoded depth data;
  - an image-accessing control circuit configured to generate a corresponding front panel two-dimensional image according to a two-dimensional display region of the frame and the encoded two-dimensional image data;
  - a calculation unit configured to:
    - obtain a relationship between sub-pixels of the two-dimensional image data and the depth data in the three-dimensional display region of the frame; and
    - generate a front panel three-dimensional image and a back panel three-dimensional image by adjusting sub-pixel grayscale values of the two-dimensional image data according to corresponding sub-pixel grayscale values of the depth data;
  - a range-adjusting circuit configured to adjust resolutions of the front panel three-dimensional image and the back panel three-dimensional image for matching the three-dimensional display region;
  - a luminescence-adjusting circuit configured to adjust luminances of the front panel three-dimensional image and the back panel three-dimensional image data according to the depth data;
  - a front panel image overlapping circuit configured to generate a front panel image by overlapping the front panel three-dimensional image and the front panel two-dimensional image; and
  - a back panel image overlapping circuit configured to generate a back panel image by overlapping the back panel three-dimensional image and a black image;
- a front panel configured to display the front panel image; and
- a back panel configured to display the back panel image.

10. The display system of claim 9 further comprising:
- a line buffer configured to store the encoded two-dimensional image data and the encoded depth data.

* * * * *